Jan. 5, 1932.  F. J. OVEN  1,839,336
ADJUSTABLE GASKET
Filed Dec. 31, 1926
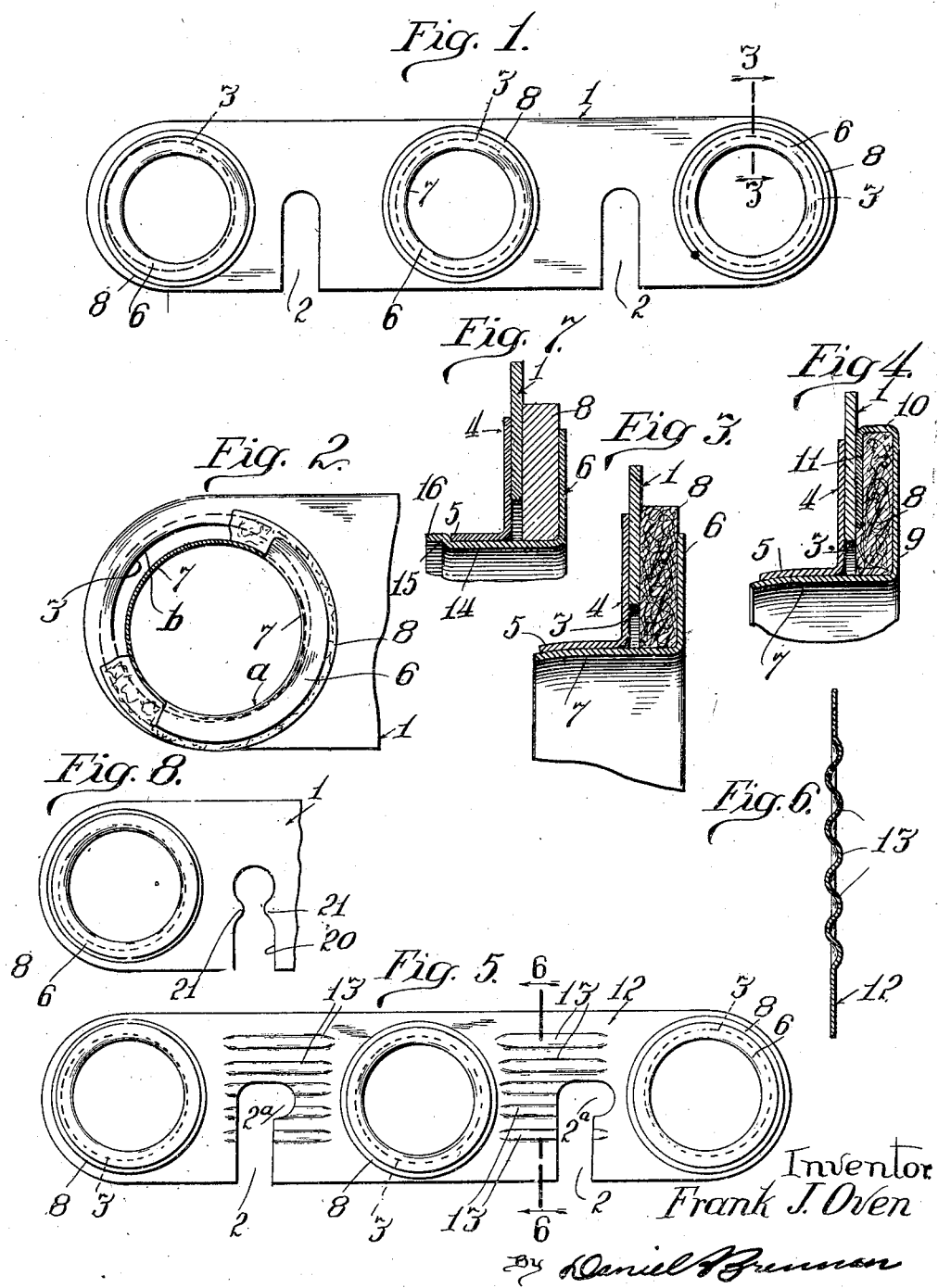
Inventor
Frank J. Oven Patented Jan. 5, 1932

1,839,336

UNITED STATES PATENT OFFICE

FRANK J. OVEN, OF CHICAGO, ILLINOIS, ASSIGNOR TO VICTOR MANUFACTURING & GASKET CO., A CORPORATION OF ILLINOIS

ADJUSTABLE GASKET

Application filed December 31, 1926. Serial No. 158,298.

This invention relates to improvements in gaskets.

It is an object of the invention to facilitate the seating of a gasket relatively to the port, conduit or conduits with which it is to be associated, by rendering the reinforcement confining the opening in the gasket movable relatively to its support. In this way the entire gasket will automatically adapt itself to the mouth of the conduit or conduits, the opening in the gasket entering into alignment with the opening of the conduit to be associated therewith.

It is also an object of the invention to provide a reinforcement for the opening in a gasket, which reinforcement may be guided on the body of the gasket or on a holder to adjust itself relatively to said holder or body of the gasket, the reinforcement including not only the customary metal rings but also a ring of refractory material, such as asbestos, said last named ring being also adjustable together with the entire reinforcement relatively to the body of the gasket.

It is, furthermore, an object of the invention to provide a gasket or holder with reinforcing elements between the openings therein, so as to prevent excessive bending of the body thereof while it is being handled or shipped.

With these and numerous other objects in view, various embodiments of the invention are described in the following specification and are illustrated in the accompanying drawings.

In the latter:

Fig. 1 is a top plan view of a gasket provided with self-centering rims;

Fig. 2 is an enlarged fragmentary view, various elements of the rim being shown broken off;

Fig. 3 is an enlarged sectional fragmentary view on line 3—3 of Fig. 1;

Fig. 4 is a similar sectional detail view of a modified reinforcement for the gasket;

Fig. 5 is a top plan view of a modified embodiment of a gasket with reinforcing portions formed on the body or holder;

Fig. 6 is an enlarged sectional view taken on line 6—6 of Fig. 5;

Fig. 7 is a fragmentary sectional view of parts similar to those shown in Figs. 3 and 4, and Fig. 8 is a top plan view similar to Fig. 5, of a modified embodiment of a gasket.

The body 1 of the gasket or holder is made of suitable flexible sheet material, such as for instance sheet, steel, bronze, or the like, and is provided with slots or notches 2 which may extend from an edge of the gasket inward and may either be straight, as shown in Fig. 1, or have angular extensions at their inner ends, as shown at 2a in Fig. 5. These notches serve for permitting the passage of the bolts (not shown) for securing the gasket in position with respect to the parts between which it is to be interposed. The body 1 of the gasket or holder is provided with a plurality of openings 3 which in the embodiments illustrated are circular, although it is obvious that in other gaskets the shape of these openings will coincide approximately with the shape and area of the conduits or parts (not shown) with which they are associated.

In order to provide a self-centering gasket relatively to these conduits, the holder is provided with shiftable reinforcing rims arranged in these openings and formed in any desired way, such as for instance as illustrated in Figures 3 and 4.

According to Figures 1 to 3, these reinforcing rims are formed of flat rings or discs 4 having circumferential flanges 5 extending upwardly from the openings therein. These discs 4 overlie one side of the body of the gasket, and from Figures 3 and 4, it will be seen that the diameter of the upstanding circumferential flange 5 is considerably smaller than the diameter of the opening 3 in the body of the gasket. A companion ring or disc 6 is located at the opposite side of the body 1 and is also provided with a similarly disposed upstanding flange 7 which is in tight engagement with the upstanding flange 5 of the first named ring or disc, the two discs 4 and 6 being not only separated from each other by the body 1 of the gasket but also by a ring 8 of refractory material, as for instance, asbestos fabric or the like. The internal diameter of the asbestos ring 8 corresponds to the external diameter of the flange 7 on one of the reinforcing members, and since this entire reinforcing assembly comprising the flanges 5 and 7, discs 4 and 6, and the asbestos ring 8 has an internal diameter smaller than the diameter of the opening 3 in the gasket, it is obvious that this reinforcing assembly may be shifted in the plane of the body 1 of the gasket so as to be brought into axial alignment with the conduit opening (not shown). The rim arranged in this manner on the gasket, while permanently connected therewith so as to be immovable in the direction of the axis of the flanges 5 and 7, is slidable and therefore becomes self-centering with respect to the conduit, losing thereby eventually its concentric position in the opening 3 in the body of the gasket.

In Fig. 1 as well as in Fig. 2 this eccentric relationship of the rim relatively to the opening 3 is clearly indicated, inasmuch as for instance at the point $a$, Fig. 2, the rim is close to the edge of the opening 3, while at the point $b$ there is a considerable distance between the edge of the opening 3 and the reinforcing rim.

It is also obvious that upon adjusting the rim relatively to the center of the opening 3 in the body of the gasket, the refractory element 8 will also be shifted since its internal diameter corresponds to the internal diameter of the flange 7.

In the modification illustrated in Fig. 3, the outer edge of the refractory ring 8 is accessible and visible, the disc or ring 6 having an outer diameter which is slightly smaller than the outer diameter of said asbestos ring. In the modification illustrated in Fig. 4, however, the upstanding reinforcing flange 7 is integral with a disc 9 having an outer upstanding circumferential flange 10 surrounding the outer edge of the asbestos ring 8, and this circumferential flange 10 is extended inwardly as indicated at 11 in substantial parallelism with, and to overlie a portion of the opposite surface of the asbestos ring 8. This modified form of reinforcing rim arranged in the opening in the gasket obviously is also self-centering and at the same time protects the refractory ring 8 against injury. In both of the embodiments the entire reinforcing rim will be adjustable to align itself automatically or manually with the conduit which is to be engaged by the reinforcing flanges 5 and 7.

The embodiment of the gasket illustrated in Figs. 5 and 6 also shows self-centering reinforcing rim assemblies separated from each other and inserted in the openings 3 in the gasket or holder, but while according to the disclosure in Fig. 1, the gasket consists of a flat sheet metal body, the body 12 of the gasket illustrated in Figs. 5 and 6, is reinforced between the openings 3 so as to withstand excessive bending strains incurred in handling, thereby facilitating the handling, storing and shipping of these articles. The reinforcing in the embodiment illustrated, consists of a plurality of corrugations 13 formed in and extending longitudinally of the gasket substantially parallel with a line that would pass through the centers of the gasket openings 3.

In the embodiment of the gasket illustrated in Fig. 7, effective means are provided for preventing the separation of the metal rims movably confined within the openings in the body 1 of the gasket. The rim disposed on one side of the body 1 may comprise a disc 4 having an upstanding flange 5 similar to the corresponding rim portion illustrated in Figures 3 and 4. The other rim section, however, is formed of a disc 6 provided with an upstanding flange 14, the marginal portion of which is offset to provide a shoulder 15 overlapping the edge of the upstanding circumferential flange 5, and this flange 14 may be continued beyond the shoulder by an offset marginal portion 16. In this way an axial movement of the rim section comprising portions 4 and 5 is absolutely prevented, as is also any axial movement of the other rim or companion section. Since the rim, as an assembled unit is formed of two interlocking sections, the interlocking portion 15 at the same time forms an effective reinforcement for the upstanding circumferential flange 14 of one of these sections, and therefore also a reinforcement for the entire rim. In all other respects this rim resembles and functions the same as the rims illustrated in Figures 3 and 4, inasmuch as it is also self-centering and adapted to align itself automatically with the conduit or port, the refractory material 8 being a disc of asbestos, the inner edge of which closely hugs the upstanding circumferential flange 14 and prevents the heat from having a detrimental effect upon the edges of the opening 3 in the body regardless of the position of the assembled rim with respect to said opening.

The modified form of the gasket body, as illustrated in Fig. 8, is provided with effective means for locking it against any movement, in position upon the bolts or pins not shown, over which the slots 2 are slipped to position it.

While according to Fig. 5 the slots or notches 2 in the body of the gasket are provided with angular extensions 2a near their inner ends, the notches or slots 20 formed in the body of the gasket, illustrated in Fig. 8, are provided with lateral extensions or projections 21 extending from the opposite edges of the slots 20 towards each other arranged so as to prevent any side shifting movement of the gasket after the bolts, not shown, for aligning the gasket have once been passed through the slots. The tongues 21, as shown in Fig. 8, are bent preferably at right angle out of the plane of the body 1 before the gasket is assembled, so that the body of the gasket may be shifted in the slots 20 into its proper position, and after having been positioned the tongues 21 may be flattened into the plane of the body 1 to constitute locking elements retaining the gasket permanently in its position.

From the above it will be apparent that the invention provides a gasket which adapts itself to a wide field of utility, owing to its novel features, the rims for the gasket openings being independently adjustable or self-centering relatively to the conduits of the engine parts, and the body also being reinforced between these reinforced openings so as to become relatively stiff and retain the shape with which it leaves the assembly machine.

I claim:

1. A gasket comprising a body provided with an opening, and a reinforcement for the edges of the opening, the reinforcement consisting of two metal elements located on opposite sides of the body of the gasket and of a refractory element associated with said metal elements and slidably disposed on the body of the gasket with said metal elements.

2. A gasket comprising a body provided with openings, reinforcing rims for said openings slidably associated with the body for movement relative thereto, said reinforcing rims comprising metal elements located at opposite sides of the gasket, and a refractory ring closely surrounding one of said first named metal elements, said ring being disposed on one of said elements to be movable therewith and being held in engagement with the body of the gasket thereby.

3. A gasket comprising a body provided with openings, and reinforcing rims for said openings slidably associated with the gasket, said reinforcing rims consisting of metal elements located at opposite sides of the gasket, and a refractory element between the same, said refractory element being arranged relatively to said metal elements for slidable movement together with said metal elements.

4. A gasket comprising a body provided with a slot and a flexible locking element extending from a lateral edge of the slot in direction towards the other lateral edge thereof.

5. A gasket having a body provided with a slot, a pair of flexible tongues in opposition to each other extending from the lateral edges of the slot and adapted to be bent from and into the plane of the body.

6. A gasket comprising a body having an opening therein, a ring element extending through said opening, said element having a peripheral flange on one end, the free margin of which is struck back in parallel spaced relation thereto, a refractory ring encircling said element and secured between said flange and said margin and engaging one side of said body, and a second ring element telescoping with said first ring element and having a peripheral flange engaging the other side of said body.

7. A gasket comprising a body having an opening therein, a ring element including a tubular portion extended through and spaced from the edges of said opening and having a peripheral flange disposed parallel to said body, a refractory ring encircling said element and disposed between said flange and one side of said body and closely surrounding said tubular portion, a second ring element including a tubular portion telescoped with the tubular portion of the first-named ring element and including a peripheral flange engaging the other face of said body, the engagement of the telescoped tubular portions with each other and the cooperative action of said peripheral flanges on opposite sides of said body securing said ring elements and said refractory ring in position.

In testimony whereof I affix my signature at 10 South La Salle St., Chicago, Illinois.

FRANK J. OVEN.